US009086825B2

(12) United States Patent
Koutrika et al.

(10) Patent No.: US 9,086,825 B2
(45) Date of Patent: Jul. 21, 2015

(54) PROVIDING SUPPLEMENTAL CONTENT BASED ON A SELECTED FILE

(71) Applicant: HEWLETT-PACKARD DEVELOPMENT COMPANY, L.P., Houston, TX (US)

(72) Inventors: Georgia Koutrika, Palo Alto, CA (US); Qian Lin, Palo Alto, CA (US); Jerry J. Liu, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 101 days.

(21) Appl. No.: 13/747,827

(22) Filed: Jan. 23, 2013

(65) Prior Publication Data
US 2014/0204423 A1 Jul. 24, 2014

(51) Int. Cl.
*G06K 15/00* (2006.01)
*G06Q 30/02* (2012.01)
*G06F 3/12* (2006.01)

(52) U.S. Cl.
CPC ............ *G06F 3/1203* (2013.01); *G06F 3/1242* (2013.01); *G06F 3/1244* (2013.01); *G06F 3/1285* (2013.01); *G06Q 30/0207* (2013.01); *G06Q 30/0251* (2013.01); *G06Q 30/0282* (2013.01)

(58) Field of Classification Search
CPC .......... H04N 1/00278; H04N 1/00965; H04N 1/0097; H04N 1/2166; H04N 1/2158
USPC ............... 358/1.1, 1.9, 1.13, 1.15, 1.16, 1.18, 358/403; 382/224, 227, 305
See application file for complete search history.

(56) References Cited

U.S. PATENT DOCUMENTS

| 7,386,547 | B2 | 6/2008 | Grasso et al. | |
| 7,424,443 | B2 | 9/2008 | Yanagisawa et al. | |
| 7,729,001 | B2 | 6/2010 | Perronnin | |
| 7,734,624 | B2 | 6/2010 | Anderson et al. | |
| 7,949,560 | B2 | 5/2011 | Peeters et al. | |
| 8,250,135 | B2 | 8/2012 | Driesen et al. | |
| 8,296,652 | B2 | 10/2012 | Ko et al. | |
| 2007/0022003 | A1* | 1/2007 | Chao et al. ...................... | 705/14 |
| 2009/0319378 | A1 | 12/2009 | Sinyagin et al. | |
| 2010/0082489 | A1* | 4/2010 | Lin et al. ......................... | 705/59 |
| 2011/0231525 | A1 | 9/2011 | Balani et al. | |
| 2011/0280640 | A1 | 11/2011 | Gnanasambandam et al. | |

(Continued)

OTHER PUBLICATIONS

Hanning Zhou, et al., Page Frame Segmentation for Contextual Advertising in Print on Demand Books; IEEE Computer Society Conference on Computer Vision and Pattern Recognition Workshops, Copyright Jun. 2009; p. 17-22.

*Primary Examiner* — Gabriel Garcia
(74) *Attorney, Agent, or Firm* — Tarolli, Sundheim, Covell & Tummino (57) ABSTRACT

A system can include a print type classifier to receive a print message that indicates that a file has been selected to be printed. The print type classifier can also determine a print type of the file. The system can also include a print content analyzer to assign a category to the file characterizing a topic of the file based on the content of the file. The print type analyzer can also generate a content representation of the file that characterizes a summary of content of the file. The system can further include a recommendation engine to provide supplemental content based on at least one of the print type, the category and the content representation of the file, wherein the supplemental content is in a printable format.

15 Claims, 7 Drawing Sheets

(56) References Cited

U.S. PATENT DOCUMENTS

| | | |
|---|---|---|
| 2012/0005670 A1 | 1/2012 | Driesen et al. |
| 2012/0078710 A1* | 3/2012 | Cramer ............... 705/14.43 |
| 2012/0263028 A1* | 10/2012 | Liu et al. ............... 369/53.44 |
| 2012/0311139 A1 | 12/2012 | Brave et al. |

* cited by examiner

PROVIDING SUPPLEMENTAL CONTENT BASED ON A SELECTED FILE

BACKGROUND

Digital printing (or simply printing) refers to methods of printing from a digital based image directly to a variety of media. In computing, a printer is a peripheral which produces a representation of an electronic file (e.g., a document) on physical media such as paper or transparency film. Some printers are local peripherals connected directly to a nearby personal computer. Some printers are network printers with built-in network interfaces that can serve any user on the network. Some local printers can be designed to support both local and network connected users concurrently. Some printers can print documents stored on memory cards or from digital cameras and scanners.

DETAILED DESCRIPTION

In many instances, there is a relatively strong connection between user interest and a file selected for printing or storing. Such a correlation is typically greater than, for example, user interest in a webpage that is merely viewed on an electronic display. This disclosure provides a system and method that can leverage identified user interest by generating supplemental content related to material selected for printing or storing.

The system can detect that a file has been selected for printing or storing. The file could be, for example, a webpage, a document, an email or the like. The system can include a supplemental content generator with a print type classifier that can identify a print type of the file. The print type can characterize a print intent (e.g., a reason for printing) the file. A print content analyzer can assign a category to the file that identifies a general topic of content of the file. The print content analyzer can also generate a content representation of the file, which content representation can summarize the content of the file. The content representation can include keywords and/or phrases extracted from the file as well as scores associated with the keywords and/or phrases. A recommendation engine can generate the supplemental content (e.g., an advertisement, a coupon, a news article, a map or the like) based on at least one of the print type, the category and the content representation of the file. In this manner, the supplemental content can be related to the content of the file, such that providing the supplemental content to a user can enhance the user's experience and/or provide an additional revenue stream by marketing material included in the supplemental content.

Figure 1:
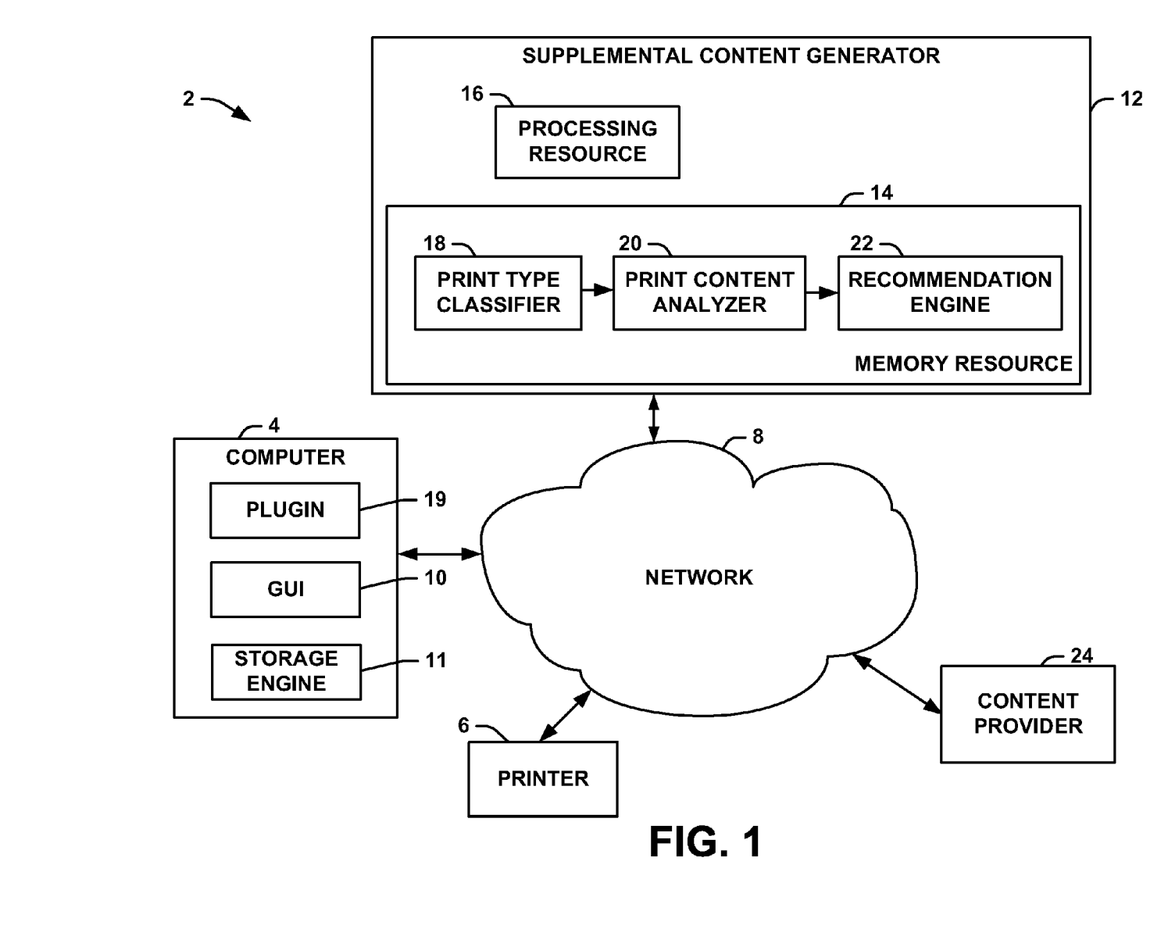
FIG. 1 illustrates an example of a system for generating supplemental content related to a file selected for printing.

FIG. 1 illustrates an example of a system 2 for generating supplemental content related to a file that has been selected to be printed and/or stored. The supplemental content can be implemented, for example as a personalized, at-print-time recommendation. The system 2 can include, for example, a computer 4, such as a laptop, a desktop computer, a tablet computer, a smartphone or the like. The computer 4 can be employed to print material, such as files (e.g., documents) on a printer 6, such as a local printer or a network printer via a network 8. The network 8 could be implemented, for example as a public network (e.g., the Internet) a private network (e.g., a local area network) or a combination thereof. The printer 6 could be implemented, for example, as an inkjet printer, a laser printer or the like. In some examples, the computer 4 and the printer 6 could be integrated, such as in a smart printer.

As a further example, the computer 4 can include a graphical user interface (GUI) 10 that can be employed to initiate a print job to print the file on the printer 6. A print job can be any file or set of files that has been submitted to be printed. The file could represent, for example, a webpage, a document, an email or the like. In some examples, the file can be stored on the computer 4 (e.g., stored in non-volatile memory). In other examples, the file can be stored on an external server (e.g., a webserver). In many instances, there is a relatively strong connection between user interest and a file selected for printing. Such a correlation is typically greater than, for example, user interest in a webpage that is merely viewed on an electronic display. The system 2 can include a supplemental content generator 12 that can leverage the user interest.

In some examples, the computer 4 can include a storage engine 11 that can be employed to store the file in a format that can be printed. For instance, the storage engine 11 can store documents (e.g., clips) that that can correspond to a webpage or some portion thereof.

The supplemental content generator 12 can be implemented, for example, on a computer, such as a server. Additionally or alternatively, the supplemental content generator 12 can be integrated with the computer 4 and/or the printer 6. The supplemental content generator 12 can include a memory resource 14 to store machine readable instructions. The memory resource 14 could be implemented, for example, as volatile memory (e.g., random access memory) and/or non-volatile memory (e.g., a hard disk drive, a solid state drive, flash memory or the like). The supplemental content generator 12 can also include a processing resource 16 to access the memory resource 14 and execute the machine readable instructions. The processing resource 16 could include, for example, a processor core.

The memory resource 14 can include a print type classifier 18 that can detect that the computer 4 has selected the file for printing and/or storing. For instance, the print type classifier 18 can detect that a print job on the printer 6, which includes the given file that has been generated, thereby causing the printer 6 to print the respective file. In some examples, to detect the print job, the print type classifier 18 can receive a print message from a plugin 19 (e.g., an applet) installed on the computer 4 that characterizes the file in the print job. In other examples, such as where the supplemental content generator 12 is integrated with a server (e.g., a printer server), the server can provide a similar print message that characterizes the file in the print job. Such a characterization of the file can include, for example, a source of the file, which source could be implemented as a uniform resource locator (URL), such as where the file corresponds to a webpage. In some examples, the file can be included with the print message; while in other examples, the file can be omitted from the print message. In yet other examples, the print message can be provided by the storage engine 11, wherein the print message can indicate that the file has been selected for storing.

Additionally, the print type classifier 18 can analyze the file to determine a print type for the file. The print type can be determined by the print type analyzer 18 for example, by employing rules and/or models that have been learnt through a machine learning process. For instance, in examples where the file is a webpage, the print type can be determined based on a URL of the webpage. In examples where the file is another type of document, the print type can be determined based on the print type classifier 18 analyzing the contents of the file. Additionally, in some examples, the file can be labeled as private by the print type classifier 18, and no further processing of the given file is executed. The given file may be labeled as private, for example, when the print type classifier 18 determines that data included in the given file is private in nature (e.g., bank account balance, a social security number, a credit card number, or the like). In other examples, if a given file is labeled as private, the entirety of the document can be parsed to determine which portion is private and which is not private. For instance, if the given file is related to a bank account, the account information can be labeled as private, while a name of the bank can be extracted. In yet other examples, based on user configuration parameters, the given file may be a private document, but the print type classifier 18 can be programmed to ignore such a label and designate the given file as non-private. In some examples, if the given file (or some portion thereof) is not labeled as private (e.g., the given file is public information), the print type can be determined. The print type can include a print intent of the given file (e.g., a reason for printing the given file). In some examples, the print type can be one of three primary types, an archive, a read-it-later or a use-it-later. In some examples, the given file can have a combination of print types.

The print type classifier 18 can, in some examples, be programmed to process the given file if the given file has a print type that is included on a list of certain print types (e.g., a print type of interest). For example, the print type classifier 18 can be programmed to only process the file if the file is printed from a webpage and not stored on a local hard drive of the computer 4. Accordingly, the print type classifier 18 can facilitate identification of web and stored files. The print type of interest can depend on the application and/or another factor, and as noted, the print type of interest can be a combination of print types. Hence, in one example, print type of interest can include web or stored content as well as private or public files. In another example, the print type of interest can pertain solely to private or public files.

The print type of the file can be labeled as an archive by the print type classifier 18 in examples where data in the file is likely to be put into storage. Examples of the archive can include a receipt, a reservation, contents of a virtual shopping cart (e.g., a cart) an account summary or the like. The print type of the file can be labeled by the print type classifier 18 as a read-it-later in examples where content in the file is likely to be read after printing. Examples of the read-it-later print type can include a news article, an encyclopedic article, a weather report, a chart, a calendar, a map, a manual, a recipe or the like. The print type of the file can be labeled by the print type classifier 18 as a use-it-later in examples where content in the file is likely to be physically employed for some purpose after printing. Examples of the use-it-later print type can include, for example, a game (e.g., a cross word puzzle), a form, a coupon, an offer (e.g., an advertisement), a trip itinerary (e.g., including a boarding pass), or the like.

The print type determined by the print type classifier 18 can be provided to a print content analyzer 20. A given file can be classified under specific categories, based on the content of the given file. The print content analyzer 20 can retrieve the content of the given file. In some examples, the print content analyzer 20 can retrieve the content of the given file from a URL associated with a given file. In other examples, such as examples where the given file is included with the print message, the print content analyzer 20 can retrieve the content of the given file directly from the given file.

The print content analyzer 20 can be employed to determine a content category of the given file, based on the content of the given file. The print content analyzer 20 can employ machine learning models, predefined patterns and rules and/or pre-specified taxonomies (e.g., specific layouts) or the like, as well as any combination thereof to determine the content category of the given file. For example, if the given file is a webpage that includes a recipe for making a particular food dish, the print content analyzer 20 can identify a set of instructions involving food in the recipe such that the given file can be assigned a content category of "food recipe" by the print content analyzer 20.

The print content analyzer 20 can also analyze the content of the given file to generate a concise representation (e.g., a summarization) of the content of the given file, which can be referred to as content representation, based on content extracted from the given file. The content representation can contain keywords, phrases as well as scores assigned to the keywords and/or phrases included in the content of the given file. As some examples, the content representation can include data identifying topics, named entities, significant concepts, structured information or that like that can be employed to characterize a summary of the content of the given file. Additionally, in an example where the given file is assigned a print category of "food recipe" by the print content analyzer 20, the print content analyzer 20 can leverage the assigned print category and extract specific content, such as ingredients, preparation time or the like to generate the content representation. In some examples, the content representation can be organized in an unstructured manner such as a list of the keywords and/or phrases extracted from the given file. In other examples, the content representation can be organized in a structure or semi-structure manner such as a set of attribute-value pairs that may or may not be nested. The print type, the print content category and the content representation of the given file can be provided to a recommendation engine 22 stored in the memory resource 14.

The recommendation engine 22 can employ the print type, the content category and/or the content representation of the given file to generate the supplemental content for the given file. The supplemental content could include, for example, advertisements, coupons, maps, news articles, webpages or the like that may enhance a user's experience based on the content of the given file that is selected to be printed.

The recommendation engine 22 can be employed to set a context of the supplemental content, which can be referred to as the supplemental context. The supplemental context can include data that identifies a specific item type or combination of item types (e.g., a webpage, a coupon, an advertisement and/or a map) that may be useful to a user that has printed the given file. The supplemental context can be set by the recommendation engine 22 based on the print type of the given file. For instance, in some examples, the print type of the given file can be employed by the recommendation engine 22 to determine a type of items that can be printed in conjunction with the given file. The print type can also be employed by the recommendation engine 22 to determine a specific recommendation strategy (e.g., algorithm) for determining the supplemental content. Further, the print type of the given file can be employed by the recommendation engine 22 to determine location and/or time constraints for the supplemental content. For example, if the given file is related to a trip reservation, the time and location of the trip may need to be considered to determine the supplemental content for the given file. Additionally or alternatively, layout constraints, such as the maximum number of pages for the supplemental content (e.g., a maximum number of 2 pages) can be included in the supplemental context. Thus, for each different print type, the supplemental context can specify items that can be recommended as well as data that identifies (i) a specific recommendation strategy (e.g., a specific algorithm for the recommendation engine 22), (ii) objectives of the recommendation engine 22 (e.g., to identify a most similar or most diverse items to be employed in the supplemental content) and/or (iii) constraints (e.g., time and location dependent constraints, layout constraints or a combination thereof). For instance, the supplemental context for a trip reservation (e.g., a coupon and/or an advertisement) may be different than the supplemental context for a news article (e.g., another news article). The recommendation engine 22 can employ the items identified in the supplemental context as well as the data identifying the specific recommendation strategy, the objectives of the recommendation engine 22 and/or the constraints included in the supplemental context to determine which items are included in the supplemental content.

The recommendation engine 22 can also assign a specific category or a combination of categories for the supplemental content based on the item types included in the supplemental context and the output from the print content analyzer 20. The recommendation engine 22 can further refine the selection of the items included in the supplemental context. For instance, if the given file is a food recipe, and the supplemental context includes a coupon, the category of the supplemental content could be a food coupon. Additionally, in some examples, the recommendation engine can assign a combination of categories to the supplemental content. In such a situation, each category can be assigned a category score that indicate a bias toward or against a specific category. The category score can be based, for example, on the content of the given file. For instance, in some examples, the given file can be associated with a primary topic and a secondary topic. In such a situation, the recommendation engine 22 would give categories of the supplemental content related to the primary topic a higher category score than those related to the secondary topic.

Additionally or alternatively, the recommendation engine 22 can assign the category score based on a business relationship with a provider of content that is within a specific category. For instance, if the supplemental content is assigned two categories, namely, a food coupon and a food recipe and a business relationship is established with a provider of food coupons but not with a provider of food recipes, the food coupons could be assigned a higher category score than that of the food recipes.

The recommendation engine 22 can retrieve material that corresponds to the category or combination of categories assigned to the supplemental content from a content provider 24 via the network 8. The content provider 24 could be implemented, for example, as a website, a server, a database, a cloud service (e.g., cloud storage) or the like. In such a situation, the term "cloud" can indicate a network fabric that includes a virtualized pool of computers that can be hosted, for example, by a cloud host (e.g., a third party). The retrieved material could correspond, for example, to a combination of specific items (e.g., a specific advertisement, a specific coupon, a specific new article or the like) that is related to the given file, which specific items can be referred to as candidates. For instance, in some examples, the candidates can be stored at a URL or another network address. Additionally or alternatively, the material can be provided to the recommendation engine 22 in response to a request message.

The recommendation engine can parse the retrieved material and assign a relevancy score to each candidate based on the print type, category and content representation of the given file as well as on content of the retrieved material. Additionally, the recommendation engine can select a subset of the candidates to generate the supplemental content. Selection of the subset of candidates can be based, for example on the relevancy score of each candidate. In some examples, the refinement of the selection of the candidate items could be based on the data identifying the specific recommendation strategy, the objectives of the recommendation engine 22 and/or the constraints included in the supplemental context. For example, the recommendation engine 22 can be programmed such that selection of the subset of candidates can ensure a certain degree of diversity. For instance, in an example where there are four candidates that are each related to an automobile advertisement, and one candidate related to a coupon for an oil change, the recommendation engine can be programmed to select two automobile advertisements and the coupon for the oil change even if the coupon for the oil change has a lower relevancy score than each of the four automobile advertisements. Moreover, in some examples, the recommendation engine can ensure that the subset of candidates is printable in a given amount of printable real-estate (e.g., a single page or multiple pages). The recommendation engine can arrange the subset of candidates to fit within the given amount of printable real-estate. The recommendation engine can provide the supplemental content in a format that is printable by the printer 6. For instance, in some examples, the supplemental content can be provided in the portable document format (PDF), HTML or any other format that can be printed on the printer 6. The supplemental content can be provided to the computer 4 (e.g., via the plugin 19).

In some examples, the GUI 10 can output (and in some examples, recommend) the supplemental content to the user, where the user can decide whether to print and/or store the supplemental content. In this example, if the user elects to print the supplemental content, a print job for the printer 6 that includes the supplemental content can be generated, thereby causing the printer 6 to print the supplemental content. In other examples, the plugin 19 can be configured, in response to user input, to automatically insert the supplemental content into the print job in which the given file is printed, thereby causing the printer 6 to print the supplemental content. Additionally, in examples where the user elects to store the supplemental content, the supplemental content can be provided to the storage engine 11 where the storage engine 11 can store the supplemental content in a memory, which memory could be local to the computer 4 (e.g., a local hard drive) and/or external to the computer 4 (e.g., cloud storage).

In either situation, the user can retrieve the supplemental content from the printer 6 so that the supplemental content can be employed effectively. For instance, the user may elect to redeem a coupon in the supplemental content and/or read a news article in the supplemental content. By employment of the system 2, the user experience can be enhanced since the supplemental content is related to the given file that was printed. Moreover, since business relationships can be established to provide the material included in the supplemental content (e.g., the subset of the candidates), a new revenue stream can be established.

Figure 2:
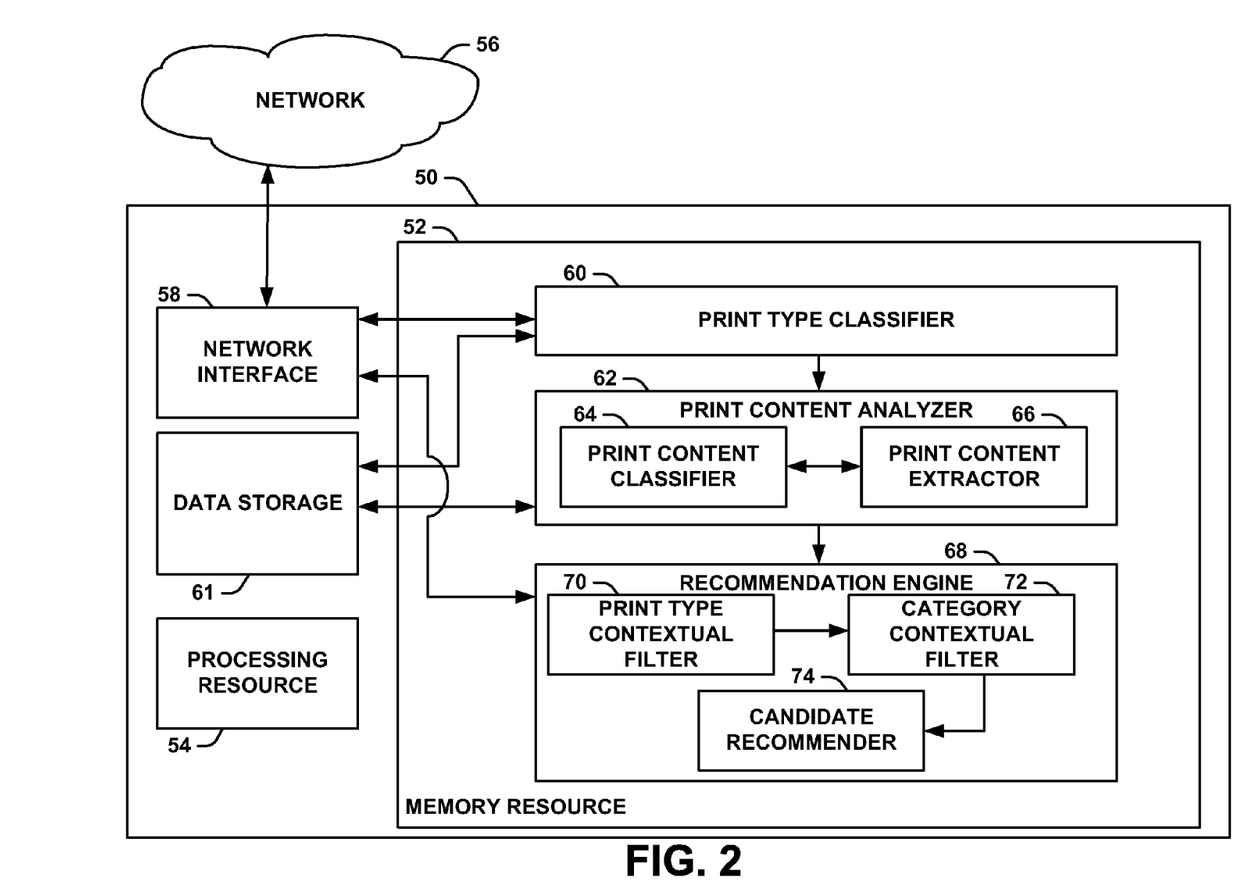
FIG. 2 illustrates an example of a supplemental content generator.

FIG. 2 illustrates an example of a supplemental content generator 50 that can be utilized to implement the supplemental content generator 12 illustrated in FIG. 1. The supplemental content generator 50 can include a memory resource 52 for storing machine executable instructions. The memory resource 52 could be a non-transitory machine readable medium. For instance, the memory resource 52 could be implemented, for example, as random access memory, flash memory, a hard disk, a solid state drive or a combination thereof. The supplemental content generator 50 can also include a processing resource 54 that can access the memory resource 52 and execute machine executable instructions. The processing resource 54 can be implemented, for example, as a processor core. The supplemental content generator 50 can be coupled to a network 56 (e.g., the Internet and/or a local area network) via a network interface 58, which could be implemented as a network interface card.

The memory resource 52 can include a print type classifier 60 that can detect that a given file has been selected for printing and/or storing. In such a situation, the given file can be already printed, be in the process of being printed, will be printed in the future (e.g., a print job that includes the given file has been generated) or may never be printed (e.g., stored in a printable format). The given file can represent a document, such as a webpage, a word processing document, a spreadsheet, an email or the like. In some examples, the print type classifier 60 can receive a print message notifying the print type classifier 60 of the printing of the given file. The print message can include, for example, a source of the given file (e.g., a URL). Moreover, in some examples, the print message can include the given file. In other examples, the given file can be omitted from the print message.

The print type classifier 60 can be programmed to determine the type of document that the given file includes. That is, the print type classifier 60 can be programmed to identify a type (or a combination of types) of the given file. In some examples, the print type classifier 60 can differentiate between private and non-private files. In other examples, the print type classifier 60 can be programmed to differentiate webpages from files stored in a computer (e.g., the computer 4 illustrated in FIG. 1). In yet other examples, the print type classifier 60 can be programmed to only analyze a print type of interest. Selection of the print type of interest can be based on a status of other components of the supplemental content generator 50. For instance, the print type of interest may be set to a webpage news article and the supplemental content generator 50 can be configured to only generate supplemental content for the given file when the given file has a print type of the print type of interest. In yet other examples, the print type can include a print intent that can characterize a reason why the given file is selected to be printed. In some examples, the print type can include a combination of elements.

In some examples, the print type classifier 60 may not be programmed to determine whether the given file includes a private document. For example, if the print type classifier 60 has a print type of interest that includes a news article, the print type classifier 60 can be programmed to omit a determination of whether the document included with the given file is private since nearly all news articles are public.

As noted, in some examples, the given file may be a private document or a public document. Examples of a private document include, for instance, a bank account statement, a webpage with a secure URL (e.g., an https://www.example.com), word processing document or a spreadsheet. If it is determined that the given file is a private document, the supplemental content generator 50 can be designed such that no supplemental content for the given file is to be generated. Accordingly, in some examples, upon determining that the given file is a private document, the print type classifier 60 can cease further processing and discard the print message. In some examples, the determination as to whether the given file is a private document can be based on a set of print type rules extracted from data storage 61. The data storage 61 could be implemented, for example as volatile memory, non-volatile memory or a combination thereof. In some examples, the data storage 61 can include a database that stores the print type rules. In some examples, the print rules can include a list of websites and information characterizing a nature of the website. For instance, the print type rules may specify that if the given file's source is http://mail.example.com, that the given file is an email, and is therefore a private document.

Additionally or alternatively, the print type classifier 60 can employ a print type model stored in the data storage 61 to determine whether the given file is a private document. The print type model could be a model generated, for example, by machine learning techniques (e.g., a classifier, a neural network or the like). For instance, the print type model can specify keywords in a URL associated with the given file and/or keywords in the content of the given file to determine whether the given file is a private document.

In some examples, if the print type classifier 60 determines that the given file includes a private document, the print type classifier 60 can be programmed to extract a non-private portion of the private document. For example, if the given file includes content related to an account summary, the non-private portion could include, for example, a name of the host of the account.

As noted, in some examples, if the print type classifier 60 determines that the given file is not a private document and/or the document includes a portion that is non-private (e.g., the given file contains publically available information), the print type classifier 60 can assign the given file to a print type, which in some examples can include the print intent to characterize the reason that the given file is printed. The given type could be determined, for example via employment of the print type model and/or the print type rules. In some examples, print type classifier 60 can classify the print type of a given file as one of three primary types: an archive, a read-it-later or a use-it-later.

The print type of the given file can be labeled as an archive in examples where data in the given file is likely to be put into physical storage (e.g., a filing cabinet). Examples of the archive can include a receipt, a reservation, contents of a virtual shopping cart (e.g., a cart) an account summary or the like. The print type of the given file can be labeled as a read-it-later in examples where data in the given file is likely to be read after printing. In some examples, a read-it-later can have instructions for a person to follow. Examples of the read-it-later print type can include a news article, an encyclopedic article, a weather report, a chart, a calendar, a map, a manual, a recipe or the like. The print type of the given file can be labeled as a use-it-later in examples where data in the given file is likely to be physically employed for some purpose after printing. A use-it-later print type can be presented to from one person to another person at a point of sale (e.g., a coupon or an advertisement) or can be directly interacted (e.g., written on) with by a person. Examples of the use-it-later print type can include, for example, a game (e.g., a cross word puzzle), a form, a coupon, an offer (e.g., an advertisement), a trip itinerary, or the like.

Figure 3:
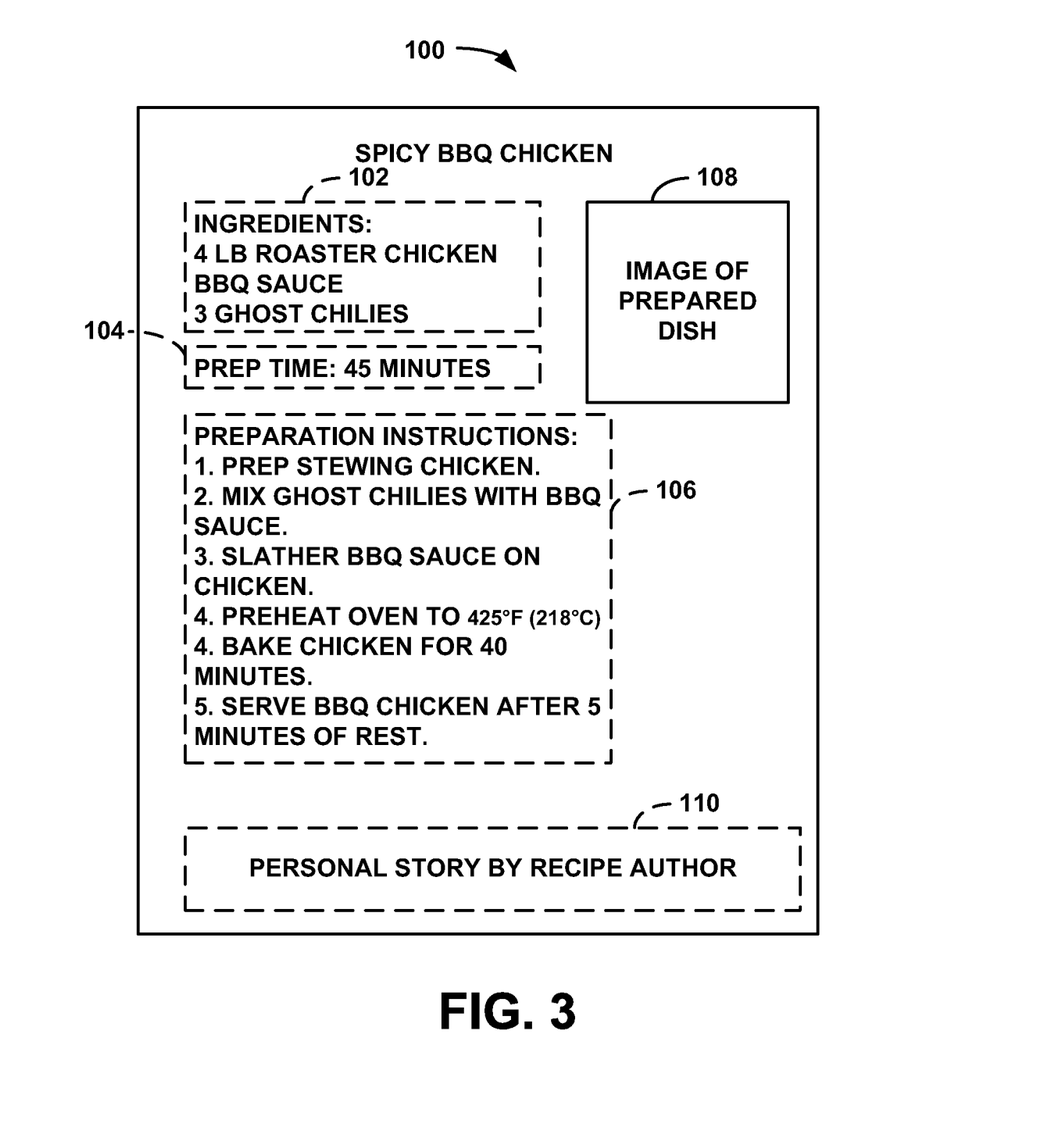
FIG. 3 illustrates an example of a webpage implemented as a file selected for printing.

Operations of the supplemental content generator 50 can be better understood with reference to two different examples. In a first example (hereinafter, "the first example") the given file can be a recipe for cooking spicy barbecue chicken. FIG. 3 illustrates an example of a webpage 100 that could be implemented as the given file in the first example. The webpage 100 can include a title (labeled in FIG. 3 as "SPICY BBQ CHICKEN"), an ingredient list 102, preparation time 104, preparation instructions 106, an image 108 of a prepared spicy barbeque chicken and a personal story 110 from the recipe author.

Figure 4:
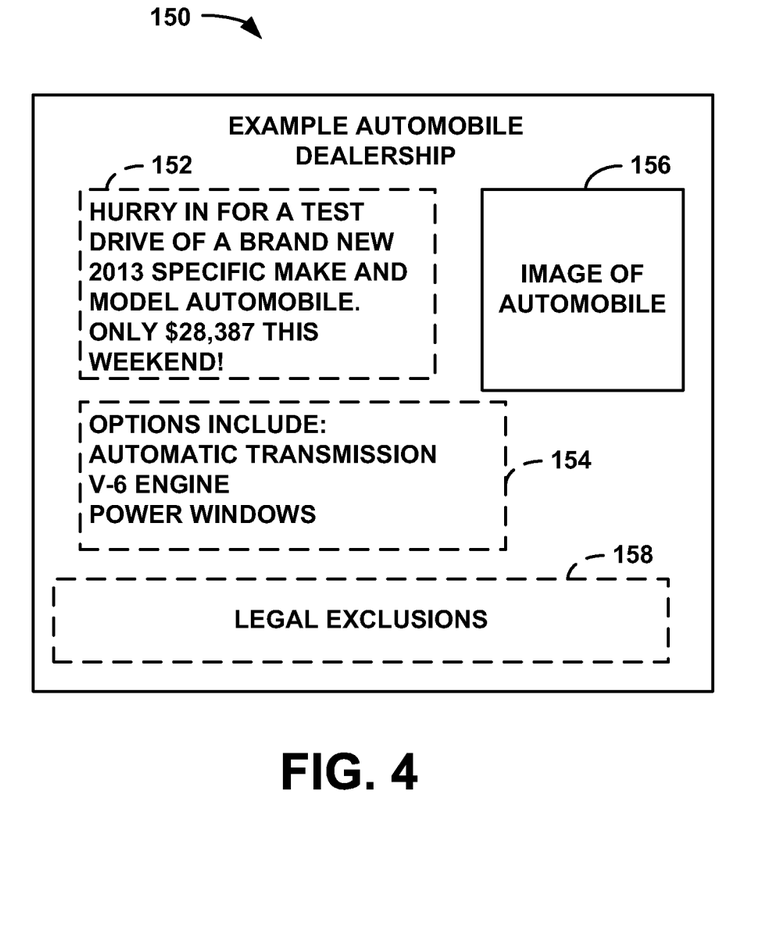
FIG. 4 illustrates another example of a webpage implemented as a file selected for printing.

In a second example (hereinafter, "the second example") the given file can be an advertisement from an automobile dealership for a special deal on a particular automobile. FIG. 4 illustrates an example of a webpage 150 that could be implemented as the given file in the second example. The webpage can include a name of the automobile dealership (labeled in FIG. 4 as "EXAMPLE AUTOMOBILE DEALERSHIP"), a description of an offer 152 that includes an identity of a specific make and model of an automobile and a price for the automobile. The webpage 150 can also include a list of options for the automobile 154, an image 156 of the automobile and legal exclusions 158 (e.g., "fine print") that includes limitations on the offer 152.

Referring back to FIG. 2, in the first example upon receiving a print message that the spicy barbeque chicken recipe is the given file that has been printed, the print type classifier 60 can determine that the spicy barbeque chicken recipe is not a private document and assign the given file a print type of read-it-later. In the second example, upon receiving a print message that the advertisement from the automobile dealership is the given file that has been printed, the print type classifier 60 can determine that the advertisement from the automobile dealership is not a private document and assign the given file a print type of use-it-later.

The print type classifier 60 can provide the print type of the given file and the given file itself to a print content analyzer 62 that can be stored in the memory resource. The print content analyzer 62 can include a print content classifier 64 that can assign a category to the given file based on the content of the given file that can characterize a topic of the content of the given file. To determine the category of the given file, the print content classifier 64 can employ print content rules extracted from the data storage 61. Additionally or alternatively, the print content classifier 64 can employ machine learning techniques that employ print content models stored in the data storage 61 to determine the category of the given file. In some examples, the category of the given file could be a food recipe, a political news article, a boarding pass, or the like. In some examples, there can be hundreds or thousands of different categories.

The print content classifier 64 can provide the category of the given file to a print content extractor 66 that can parse the content to generate a concise representation that characterizes the content of the given file, which can be referred to as a content representation. The content representation can include topics, named entities, important concepts, structured information or the like that can be employed to describe and/or summarize the content of the given file. To generate the content representation, the print content extractor 66 can employ print content taxonomy, a print content dictionary, rules, patterns or a combination thereof that can be stored in the data storage 61. Additionally or alternatively, the print content extractor 66 can interact with an external knowledge source to analyze the content of the given file. The external knowledge source could be implemented, for example, as a database, the Internet, an online resource, a dictionary, an encyclopedia, a directory, a manual, a calendar, a catalog, a blog, an index, a statistical model, or the like, or a combination thereof. For example, the print content extractor 66 can be programmed to recognize that the content of the given file includes a reference to an airport code. In such a situation, in some examples, the print content extractor 66 may not include sufficient data to determine which airport is represented by the airport code in the content of the given file. In such an example, the print content extractor 66 can be configured to query a database that contains information that can match the airport code to a physical airport. Additionally or alternatively, in some examples, the print content extractor 66 initiate a web search to determine a meaning of information extracted from the given file.

In some examples, the extraction executed by the print content extractor 66 can be implemented by a set of methods, wherein each method is configured to target a specific type of information (e.g., concepts, named entities or the like) and/or target specific types of content in the given file. For instance, if the given file is assigned a category of "political news article," the print content extractor 66 can target and extract candidate names, a specific election or the like that can be included as the content representation.

Moreover, the print content classifier 64 and the print content extractor 66 can operate in concert to achieve a synergistic effect. For instance, the category assigned by the print content classifier 64 can be narrowed (e.g., refined) as a result of the content representation generated by the print content extractor 66. For instance, in the example where the assigned category is the "political news article" and the content representation includes the names of the candidates and the specific election, the print content classifier 64 can narrow (e.g., refine) the category of the given file to a political article related to a specific election year, and a specific elected position that is at stake (e.g., political article of the 2012 U.S. Presidential Election).

Continuing with the first example where the given file is a recipe for spicy barbecued chicken, the print content classifier 64 could assign the given file a category of "food recipe." Additionally, content representation generated by the print content extractor 66 could include, for example, the prep time, the ingredient list, the personal story of the recipe author or the like. Additionally, in some examples, the print content classifier 64 could narrow (e.g., refine) the category of the given file to "chicken recipe" based on the content representation of the given file.

Continuing with the second example, where the given file is an advertisement from an automobile dealership, the print content classifier 64 could assign the given file a category of "automobile advertisement." In the second example, the content representation generated by the print content extractor 66 can include, for example, a name of the automobile dealership, the make and model of the automobile advertised, the price in the advertisement from the automobile dealership, the legal exclusions or the like. Additionally, in some examples, the print content classifier 64 could narrow the category of the given file to "NEW AUTOMOBILE SALES ADVERTISEMENT" based on the content representation of the given file.

The print type, the category, the content representation and the given file can be provided to a recommendation engine 68 included in the memory resource 52. The recommendation engine 68 can generate the supplemental content for the given file based on the print type, the category and the content representation determined for the given file. The supplemental content could include, for example, specific instances of advertisements (e.g., a specific deal on an automobile at a specific automobile dealership), coupons (e.g., a coupon for 50% off strawberries at a specific market place), maps (e.g., a map to specific restaurant), news articles (e.g., a news article about a local election) a specific webpage (e.g., a front page of a news website) or the like that may enhance a user's experience based on the content of the given file that is printed.

The recommendation engine 68 can include a print type contextual filter 70 that can be employed to set a context of the supplemental content, which can be referred to as the supplemental context. The supplemental context can include data that identifies a specific item type or combination of item types (e.g., a webpage, a coupon, an advertisement and/or a map) that may be useful to a user that has printed the given file. For instance, the supplemental context for a boarding pass (e.g., a coupon, an advertisement and/or a map) may be different than the supplemental context for an events calendar (e.g., a news article).

In some examples, the print type of the given file can be employed by the print type contextual filter 70 to determine a type of items that can be printed in conjunction with the given file. The print type of the given file can also be employed by the print type contextual filter 70 for determining a specific recommendation strategy (e.g., algorithm) for determining the supplemental content. Further, the print type of the given file can be employed by the print type contextual filter 70 to determine location and/or time constraints for the supplemental content. For example, if the given file is related to a trip reservation, the time and location of the trip may need to be considered to determine the supplemental content for the given file. Additionally or alternatively, layout constraints, such as the maximum number of pages for the supplemental content (e.g., a maximum number of 2 pages) can be included in the supplemental context. Thus, for each different print type, the supplemental context can specify which items that can be recommended as well as data that identifies (i) a specific recommendation strategy (e.g., a specific algorithm for the recommendation engine 68), (ii) objectives of the recommendation engine 68 (e.g., to identify a most similar or most diverse items to be employed in the supplemental content) and/or (iii) a constraints (e.g., time and/or location dependent constraints, layout constraint or a combination thereof). The supplemental context for the given file can be provided to a category contextual filter 72 of the recommendation engine 68.

The category contextual filter 72 of the recommendation engine 68 can assign a category or a combination of categories for the supplemental content based on the item types and/or the data included in the supplemental context and the output from the print content analyzer 62. The category contextual filter 72 can further refine the selection of the items included in the supplemental context. For instance, if the given file is a boarding pass, and the supplemental context includes a coupon, the category of the supplemental content could be a drink coupon. Additionally, in some examples, the category contextual filter 72 can assign a combination of categories to the supplemental content. In such a situation, each category can be assigned a category score that indicates a bias toward or against a specific category. The category score can be computed based, for example, on the content of the given file. For instance, in some examples, the given file may be associated with a primary topic and a secondary topic. In such a situation, categories of the supplemental content related to the primary topic would be given a higher category score than those related to the secondary topic.

Additionally or alternatively, the category score can be computed based on a business relationship with a provider of a content that is within a specific category. For instance, if the supplemental content is assigned two categories, namely, a drink coupon and a map and a business relationship is established with a provider of drink coupons but not with a provider of maps, the drink coupons category could be assigned a higher category score than that of the maps category.

A candidate recommender 74 of the recommendation engine 68 can retrieve (e.g., via the network interface 58) material that corresponds to the category or combination of categories assigned to the supplemental content from a content provider via the network 56. The retrieved material could correspond, for example, to a combination of specific items (e.g., a specific advertisement, a specific coupon, a specific new article) that is related to the given file, which specific items can be referred to as candidates. For instance, in some examples, the candidates can be stored at a URL or another network address. In other examples, the material can be provided to the candidate recommender 74 in response to a request message.

The candidate recommender 74 can parse the retrieved material and assign a relevancy score to each candidate based on the print type, category and content representation of the given file. Additionally, the candidate recommender 74 can select a subset of the candidates to generate the supplemental content. Selection of the subset of candidates can be based, for example on the relevancy score of each candidate. In some examples, the refinement of the selection of the items could be based on the data identifying the specific recommendation strategy, the objectives of the recommendation engine 68 and/or the constraints included in the supplemental context. For example, the candidate recommender 74 can be programmed to ensure that the selection of the subset of candidates achieves a certain degree of diversity. For instance, in an example where the given file includes a boarding pass and there are four candidates that are each related to drink coupons, and one candidate is related to an advertisement for a rental car, the candidate recommender 74 can be programmed to select two drink coupons and the rental car advertisement even if the rental car advertisement has a lower relevancy score than each of the four drink coupons. Moreover, in some examples, the candidate recommender 74 can ensure that the subset of candidates is printable in a given amount of printable real-estate (e.g., a predetermined region of a page, a single page or a specific number of pages). The candidate recommender 74 can layout the subset of the candidates in manner that leverages the given amount of printable real-estate. The candidate recommender 74 can provide the supplemental content in a format that is printable by the same printer that printed (or is assigned to print) the given file. For instance, in some examples, the supplemental content can be provided in the PDF. The candidate recommender 74 can provide to a computer via a plugin. In some examples, the computer can provide (e.g., display) the supplemental content to a user, wherein the user can elect (or decline) to print and/or store the supplemental content based on a configuration of the computer.

Continuing with the first example where the given file is a recipe for spicy barbeque chicken, the print type contextual filter 70 can set a supplemental context of a webpage, a coupon and a map. Moreover, the category contextual filter 72 of the recommendation engine 68 can assign a combination of categories that can include a food recipe, a food coupon, a map to a grocer for a specific ingredient and an article about the author of the recipe. Further, the category contextual filter 72 could assign a grocer map for a specific and perhaps hard to find ingredient (e.g., ghost chilies) a highest category score and the article the author of the food recipe a category lowest score and the food recipe and food coupon middle category scores.

The candidate recommender 74 can retrieve material corresponding to the food recipe, the food coupon, the article about the author of the food recipe and the map from a content provider. In the first example, it is presumed that the retrieved material includes eight different chicken recipes, a coupon for chicken, a coupon for barbeque sauce, a map to a grocer that sells ghost chilies and a personal article about the author of the recipe as candidates. The candidate recommender 74 could, for example, select and layout the subset of the candidate that includes the map to the grocer that sell ghost chilies, the coupons for chicken and barbeque sauce and one chicken recipe, such that the subset of candidates can be printed on a single page and still achieve a certain degree of diversity.

Continuing with the second example where the given file is an advertisement from an automobile dealership, the print type contextual filter 70 can set a supplemental context of a webpage, an advertisement and a map. Moreover, the category contextual filter 72 of the recommendation engine 68 can assign a combination of categories that can include a vehicle review, a bank financing offer, an advertisement for a similar automobile and a map to the dealership identified in the given file. Further, the category contextual filter 72 could assign the bank financing offer a highest category score (e.g., due to a business relationship with a bank) and the map to the dealership a lowest category score and the advertisement for a similar automobile and the vehicle review a middle category score.

The candidate recommender 74 can retrieve material corresponding to the vehicle review, the bank financing offer, the advertisement for a similar automobile and the map to the dealership from a content provider. In the second example, it is presumed that the retrieved material includes three different vehicle reviews, a single bank offer, fifteen advertisements for similar automobiles and a map to the automobile dealership as candidates. The candidate recommender 74 could, for example, select and layout the subset of the candidate that includes the vehicle review, the bank offer, and two advertisements for similar automobiles, such that the subset of candidates can be printed on a single page and still achieve a certain degree of diversity.

Figure 5:
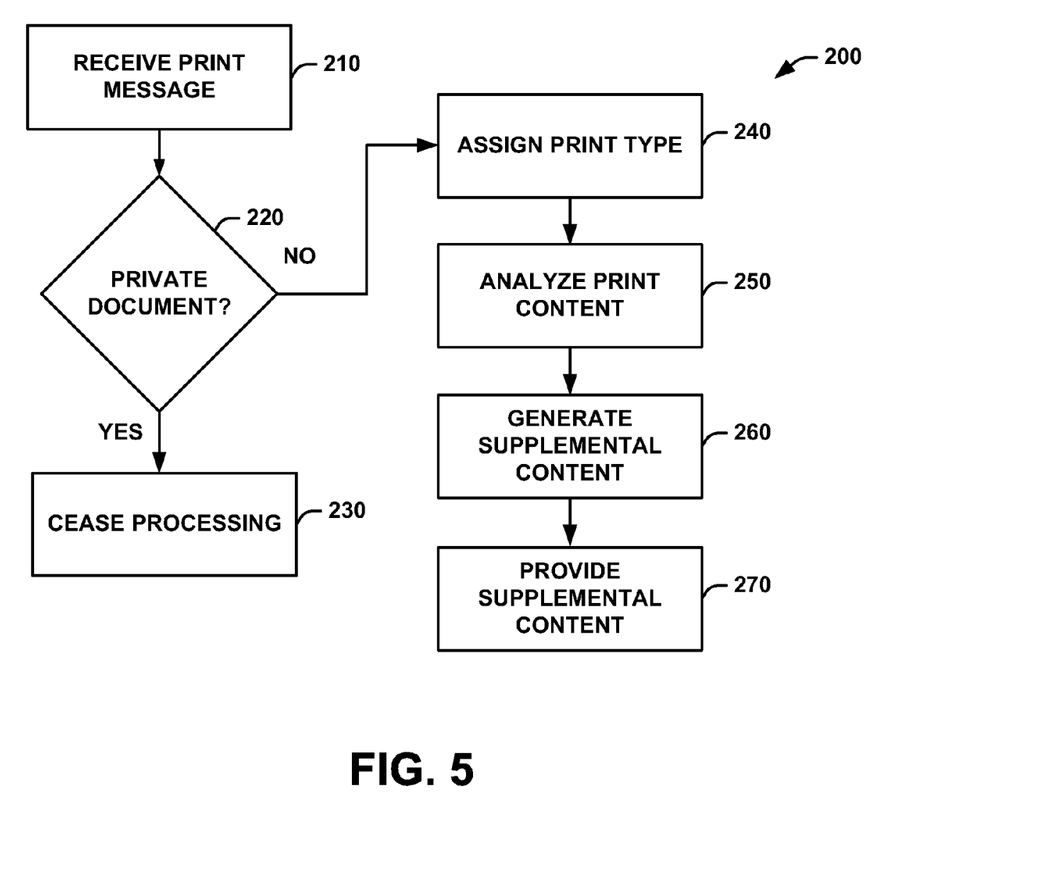
FIG. 5 illustrates a flowchart of an example method for generating supplemental content related to a file selected for printing.
Figure 7:
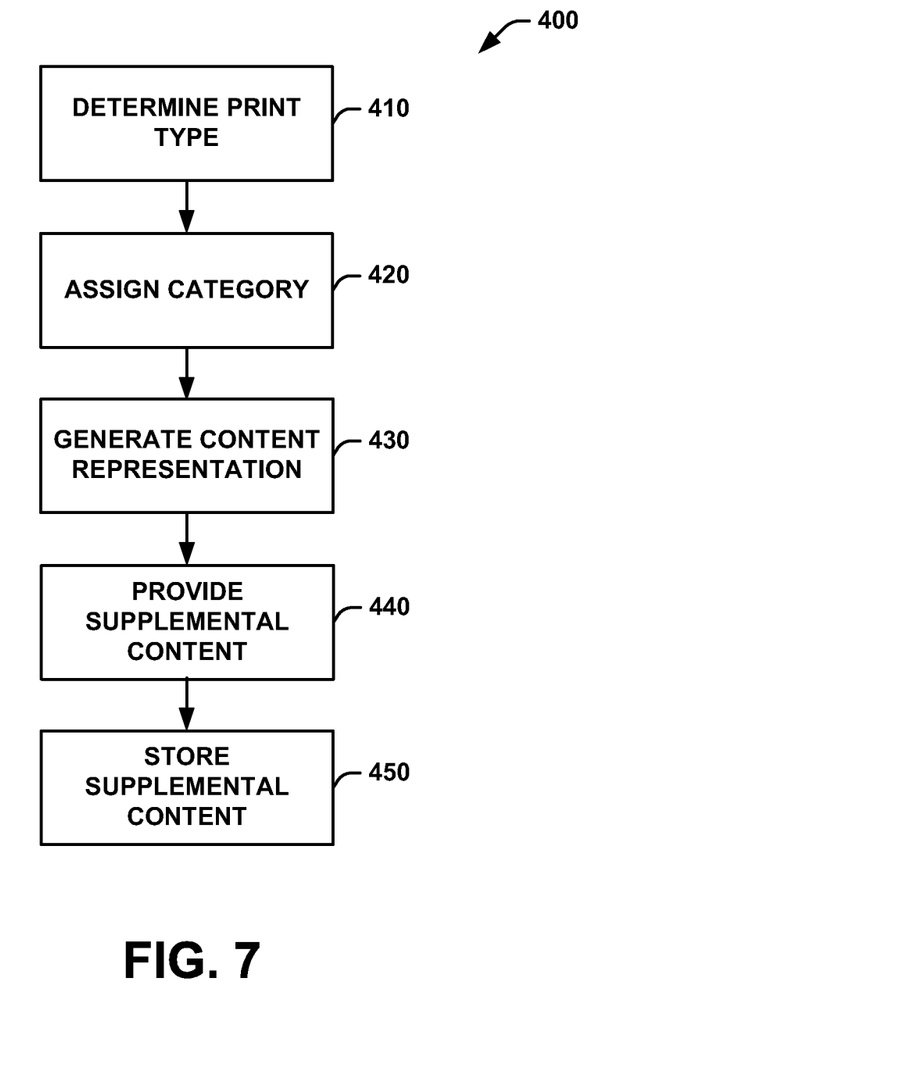
FIG. 7 illustrates another flowchart of an example method for generating supplemental content related to a file selected for printing.

In view of the foregoing structural and functional features described above, example methods will be better appreciated with reference to FIGS. 5 and 7. While, for purposes of simplicity of explanation, the example methods of FIGS. 5 and 7 are shown and described as executing serially, it is to be understood and appreciated that the present examples are not limited by the illustrated order, as some actions could in other examples occur in different orders and/or concurrently from that shown and described herein. Moreover, it is not necessary that all described actions be performed to implement a method. The example methods of FIGS. 5 and 7 can be implemented as instructions stored in a non-transitory machine-readable medium. The instructions can be accessed by a processing resource and executed to perform the methods disclosed herein.

FIG. 5 illustrates a flow chart of an example method 200 for generating supplemental content. The method 200 could be executed, for example, by a supplemental content generator (e.g., the supplemental content generator 12 illustrated in FIG. 1 and/or the supplemental content generator 50 illustrated in FIG. 2). At 210, a print message can be received by a print type classifier (e.g., the print type classifier 18 illustrated in FIG. 1 and/or the print content classifier 64 illustrated in FIG. 2). The print message can be provided, for example, by a plugin or a storage engine installed in a computer, such as the plugin 19 or the storage engine 11 illustrated in FIG. 1. Alternatively, the print message could be provided from a print server or a smart printer. The print message can include a notification that a given file has been selected for printing and/or storing. The given file could be implemented, for example, as a webpage, a spreadsheet, a word processing document, an email or the like. The print message can include data identifying a source of the given file. In some examples, the given file can be included with the print message, while in other examples; the given file can be omitted from the print message. At 220, a determination by a print classifier (e.g., the print type classifier 18 illustrated in FIG. 1 and/or the print type classifier 60 illustrated in FIG. 2) can be made as to whether the given file is a private document, such as a bank statement, an email or the like, as described with respect to FIGS. 1 and 2. The determination can be based, for example, on content of the given file and/or on a source of the given file. For instance, if the source of the given file is a secure URL (e.g., "https://"), the given file may be determined to be a private document. If the determination at 220 is positive (e.g., YES) the method 200 can proceed to 230. If the determination at 220 is negative (e.g., NO), the method 200 can proceed to 240. At 230, processing of the given file is ceased, such that no supplemental content is generated.

At 240, a print type characterizing a reason for printing the given file (e.g., print intent) can be assigned to the given file by the print type classifier. The print type can be, for example, archive, read-it-later or use-it-later. At 250, a print content analyzer (e.g., the print content analyzer 20 of FIG. 1 and/or the print content analyzer 62 of FIG. 2) of the supplemental content generator can analyze content of the given file to determine a category (e.g., a topic) and a content representation (e.g., a summary) of the content of the given file as explained with respect to FIGS. 1 and 2. At 260, the supplemental content can be generated by a recommendation engine (e.g., the recommendation engine 22 illustrated in FIG. 1 and/or the recommendation engine 68 illustrated in FIG. 2) based on the print type, the category and the content representation of the given file. The supplemental content is related to the content of the given file and can be in a printable format (e.g., PDF). At 270, the supplemental content can be provided by the recommendation engine to a computer (e.g., the computer 4 illustrated in FIG. 1). In some examples, a user can elect or decline to print the supplemental content. In other examples, the computer can push the supplemental content to the printer (e.g., the printer 6 illustrated in FIG. 1) where the supplemental content can be printed automatically. In still other examples, the user can elect to store the supplemental content at a storage engine (e.g., the storage engine 11 illustrated in FIG. 1).

By utilization of the method 200, a user's experience can be enhanced since the supplemental content is related to the content of the given file. Moreover, material included in the supplemental content can be marketed, such that a new revenue stream can be generated.

Figure 6:
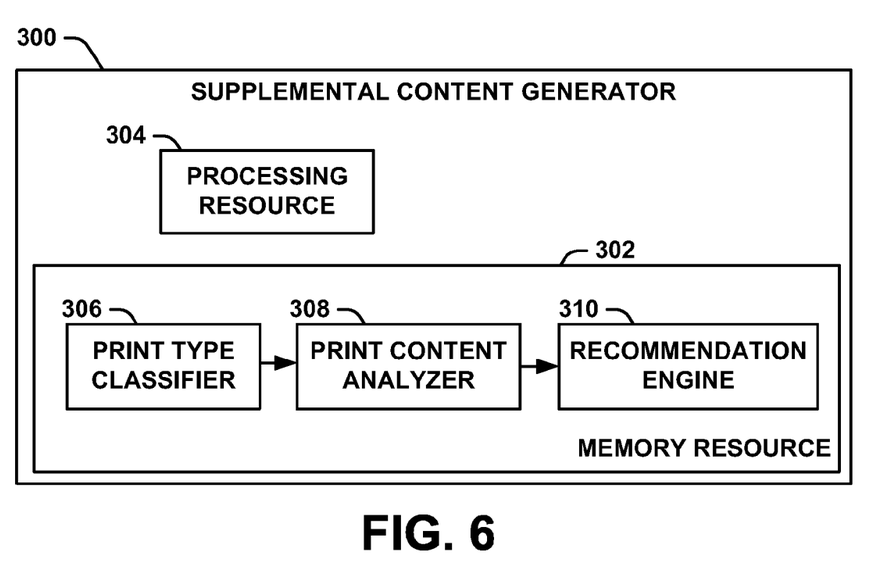
FIG. 6 illustrates another example of a supplemental content generator.

FIG. 6 illustrates another example of a supplemental content generator 300 that can be employed to generate supplemental content related to content of a given file selected for printing and/or storing. The supplemental content generator 300 could be employed for example to implement the supplemental content generator 12 illustrated in FIG. 1. The supplemental content generator 300 can include a memory resource 302 (e.g., volatile or non-volatile memory) that can be employed to store machine readable instructions. The memory resource 302 could be a non-transitory machine readable medium. The supplemental content generator 300 can also include a processing resource 304 (e.g., a processor core) that can access the memory resource 302 and execute the machine readable instructions. The memory resource 302 can include a print type classifier 306 to receive a print message that the given file has been selected to be printed. The print type classifier 306 can also determine a print type of the given file. The memory resource 302 can also include a print content analyzer 308 to assign a category to the given file characterizing a topic of the given file based on the print type of the given file. The print content analyzer 308 can also generate a content representation of the given file that characterizes a summary of content of the given file. The memory resource 302 can further include a recommendation engine 310 to provide supplemental content based on at least one of the print type, the category and the content representation of the given file.

FIG. 7 illustrates another flowchart of an example method 400 for supplemental content related to content of a given file selected to be printed and/or stored. The method could be implemented, for example, by the supplemental content generator 12 illustrated in FIG. 1. At 410 a print type of the given file can be determined (e.g., by the print type classifier 20 illustrated in FIG. 1). The print type can characterize a reason that the given file has been selected to be printed. At 420, a category can be assigned (e.g., by the print content analyzer 20 illustrated in FIG. 1) to the given file characterizing a topic of the given file based on the print type of the given file. At 430, a content representation of the given file can be generated (e.g., by the print type classifier 18 illustrated in FIG. 1) that characterizes a summary of content of the given file. The content representation can include a keyword and a phrase extracted from the content of the given file. At 440 the supplemental content can be provided (e.g., by the recommendation engine 22 illustrated in FIG. 1) based on the print type, the category and the content representation of the given file. At 450 the supplemental content can be stored in a memory (e.g., the memory resource 14 of FIG. 1).

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A non-transitory computer readable medium having machine executable instructions comprising:
   a print type classifier to:
      receive a print message that indicates that a file has been selected to be at least one of printed and stored; and
      determine a print type of the file;
   a print content analyzer to:
      assign a category to the file characterizing a topic of the file based on the print type of the file; and
      generate a content representation of the file that characterizes a summary of content of the file; and
   a recommendation engine to provide supplemental content based on at least one of the print type, the category and the content representation of the file.

2. The non-transitory computer readable medium of claim 1, wherein the content representation of the file is generated based on the category of the file.

3. The non-transitory computer readable medium of claim 1, wherein the print type characterizes a reason for printing the file.

4. The non-transitory computer readable medium of claim 3, wherein the print type of the file is archive, read-it-later or use-it-later.

5. The non-transitory computer readable medium of claim 1, wherein the print content analyzer comprises:
   a print content classifier to assign the category to the file based on at least one of a source of the file that is included in the print message and content of the file; and
   a print content extractor to generate the content representation of the file, wherein the content representation of the file includes at least one of a keyword or a phrase determined based on at least one of the content and the source of the file.

6. The non-transitory computer readable medium of claim 5, wherein the print content classifier and the print content extractor are to operate in concert to refine the category of the file and the content representation of the file.

7. The non-transitory computer readable medium of claim 1, wherein the recommendation engine comprises:
   a print type contextual filter to set a context of the supplemental content, wherein the context of the supplemental content includes a combination of item types for the supplemental content and the context of the supplemental content includes a factor for selecting the supplemental content, wherein the factor is based on the print type of the file and the factor comprises at least one of a time constraint, a location constraint, a recommendation strategy and a layout constraint;
   a category contextual filter to:
      assign a context category to each item type included in the context of the supplemental content to generate a combination of categories; and
      assign a category score to each context category in the combination of categories;
   a candidate recommender to:
      retrieve material based on the context of the supplemental content to generate a plurality of content candidates;
      assign a relevancy score to each candidate in the plurality of content candidates based on the print type, category and content representation of the file; and
      select a subset of the plurality of content candidates to generate the supplemental content.

8. The non-transitory computer readable medium of claim 7, wherein the category score is based on a business relationship of a provider of material corresponding to a category in the combination of categories.

9. The non-transitory computer readable medium of claim 7, wherein the subset of the plurality of content candidates is selected to achieve a level of diversity between the plurality of content candidates in the subset of the plurality of candidates.

10. The non-transitory computer readable medium of claim 9, wherein the supplemental content is printable on a single page.

11. The non-transitory computer readable medium of claim 1, wherein the supplemental content is in a printable format.

12. The non-transitory computer readable medium of claim 1, wherein the supplemental content includes at least two of an advertisement, a map, an article and a coupon.

13. A method comprising:
  determining a print type of a file that has been selected to be at least one of: printed and stored, wherein the print type of the file characterizes a reason that the file has been selected to be printed;
  assigning a category to the file characterizing a topic of the file based on the print type of the file;
  generating a content representation of the file that characterizes a summary of content of the file, wherein the content representation comprises a keyword and a phrase extracted from the content of the file;
  providing supplemental content based on the print type, the category and the content representation of the file; and
  storing the supplemental content in a memory.

14. The method of claim 13, wherein the supplemental content comprises at least two of an advertisement, a map, an article and a coupon that are each related to the content of the file.

15. A system comprising:
  a memory resource to store machine readable instructions; and
  a processing resource to execute the machine readable instructions, the machine readable instructions comprising:
  a print type classifier to:
    receive a print message that includes a source of a file that has been selected to be printed; and
    determine a print type of the file, wherein the print type characterizes a reason for printing the file;
  a print content analyzer comprising:
    a print content classifier to assign a content category to the file that characterizes a topic of the file, wherein the content category is assigned based on at least one of the source of the file and content of the file; and
    a print content extractor to generate a content representation of the file that characterizes a summary of content of the file, wherein the content representation of the file includes at least one of a keyword or a phrase included in the content of the file; and
  a recommendation engine to provide supplemental content related to the content of the file.

* * * * *